(12) United States Patent
Tanahashi et al.

(10) Patent No.: US 10,259,408 B2
(45) Date of Patent: Apr. 16, 2019

(54) VEHICLE AND MANUFACTURING METHOD FOR VEHICLE

(71) Applicant: TOYOTA JIDOSHA KABUSHIKI KAISHA, Toyota-shi, Aichi-ken (JP)

(72) Inventors: Toshio Tanahashi, Susono (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/634,083

(22) Filed: Jun. 27, 2017

(65) Prior Publication Data

US 2018/0001851 A1 Jan. 4, 2018

(30) Foreign Application Priority Data

Jun. 29, 2016 (JP) .................. 2016-129246

(51) Int. Cl.
*B60R 16/00* (2006.01)
*B60R 16/06* (2006.01)
*B60L 15/00* (2006.01)
*B62D 65/02* (2006.01)
(Continued)

(52) U.S. Cl.
CPC ............ *B60R 16/06* (2013.01); *B60L 3/0084* (2013.01); *B60L 15/007* (2013.01); *B62D 65/02* (2013.01); *B60K 6/405* (2013.01); *B60L 2210/10* (2013.01); *B60L 2210/40* (2013.01);
(Continued)

(58) Field of Classification Search
CPC . B60R 16/06; B60R 6/28; B60L 11/18; B60L 11/123
See application file for complete search history.

(56) References Cited

U.S. PATENT DOCUMENTS 3,099,774 A * 7/1963 Crane ....................... H05F 3/02
346/33 MC
5,825,605 A * 10/1998 Sutherland ............. B60R 16/06
361/216
(Continued)

FOREIGN PATENT DOCUMENTS

JP 2010-177128 A 8/2010
JP 2016-131427 A 7/2016

OTHER PUBLICATIONS

U.S. Appl. No. 15/634,224, filed Jun. 27, 2017, 47 pages.

*Primary Examiner* — Hau V Phan
(74) *Attorney, Agent, or Firm* — Hunton Andrews Kurth LLP

(57) ABSTRACT

A vehicle includes a vehicle body, a tire held by the vehicle body, an electric power control unit including at least one of an inverter and a converter, a case housing the electric power control unit, a first predetermined member connected to the vehicle body in an insulated state, a self-discharge static eliminator configured to reduce the positive potential of the first predetermined member by elimination of static electricity, and a transfer member electrically connecting a first connecting portion and a second connecting portion to each other. Accordingly, static electricity charged to the electric power control unit is transferred to a portion, where static elimination is performed by the self-discharge static eliminator, of the first predetermined member via the case and the transfer member so as to be neutralized and eliminated.

19 Claims, 11 Drawing Sheets

(51) Int. Cl.
*B60L 3/00* (2019.01)
*B60K 6/405* (2007.10)

(52) U.S. Cl.
CPC ..... *B60L 2270/147* (2013.01); *B60Y 2306/09* (2013.01); *Y10S 903/952* (2013.01)

(56) References Cited

U.S. PATENT DOCUMENTS

| | | | | |
|---|---|---|---|---|
| 6,620,380 | B2 * | 9/2003 | Thomas | A61L 2/20 |
| | | | | 252/187.21 |
| 8,432,658 | B1 * | 4/2013 | Heise | F01N 13/16 |
| | | | | 361/217 |
| 9,895,981 | B2 * | 2/2018 | Cimatti | B60L 11/18 |
| 2003/0107352 | A1 * | 6/2003 | Downer | B60L 11/123 |
| | | | | 322/40 |
| 2010/0044131 | A1 * | 2/2010 | Teraya | B60K 6/445 |
| | | | | 180/65.265 |
| 2010/0116574 | A1 * | 5/2010 | Gilmore | B60K 6/28 |
| | | | | 180/65.285 |
| 2013/0198440 | A1 * | 8/2013 | Oh | G11C 11/5628 |
| | | | | 711/103 |
| 2014/0209209 | A1 * | 7/2014 | Aitken | B67D 7/42 |
| | | | | 141/311 R |
| 2015/0357852 | A1 * | 12/2015 | Nakao | G01R 31/3624 |
| | | | | 320/162 |
| 2016/0108868 | A1 * | 4/2016 | Tanahashi | F02M 35/10321 |
| | | | | 123/184.61 |
| 2016/0200270 | A1 | 7/2016 | Tanahashi et al. | |

* cited by examiner

VEHICLE AND MANUFACTURING METHOD FOR VEHICLE

INCORPORATION BY REFERENCE

The disclosure of Japanese Patent Application No. 2016-129246 filed on Jun. 29, 2016 including the specification, drawings and abstract is incorporated herein by reference in its entirety.

BACKGROUND

1. Technical Field

The disclosure relates to a vehicle including an electric power control unit electrically connected to an electric device such as a drive motor or an accessory, and further relates to a manufacturing method for the vehicle.

2. Description of Related Art

Japanese Patent Application Publication No. 2010-177128 (JP 2010-177128 A) discloses a battery that supplies electric power to accessories installed in a vehicle. A lid of the battery is made of a resin material. An electrostatic induction member is attached to the lid so as to allow static electricity charged to a person in contact with the battery to flow to a vehicle body. The electrostatic induction member is attached to the lid at a position that is determined such that even when the static electricity flows from the person to the electrostatic induction member to produce a spark, the spark does not ignite gas staying in the battery or gas discharged from the battery.

SUMMARY

In the meantime, an electric power control unit electrically connected to an electric device such as a drive motor or an accessory may generate static electricity while it is in operation. On the other hand, tires are usually made of a material, such as rubber, having a high electric resistance. Therefore, the static electricity generated in the electric power control unit cannot be eliminated by allowing it to flow to the road surface and thus is charged to the electric power control unit or to a vehicle body. There is a possibility that the controllability of electric power that is input to the electric power control unit or electric power that is output from the electric power control unit may be reduced or degraded due to the influence of the charged static electricity.

The disclosure has been made in view of the above-described technical problems, and an object of the disclosure is to provide a vehicle that can neutralize and eliminate static electricity of an electric power control unit electrically connected to an electric device such as a drive motor or an accessory, and further to provide a manufacturing method for the vehicle.

A first aspect of the disclosure is a vehicle. The vehicle includes a vehicle body, a tire, a case, an electric power control unit, a first predetermined member, a self-discharge static eliminator, and a transfer member. The tire has an electric resistance value greater than or equal to a first predetermined value. The tire is held by the vehicle body. The case and the electric power control unit are mounted on the vehicle body. The case houses the electric power control unit. The electric power control unit includes at least one of an inverter and a converter. The first predetermined member is mounted on the vehicle body. An electric resistance between the first predetermined member and the vehicle body is greater than or equal to a second predetermined value. The self-discharge static eliminator is connected to the first predetermined member. The self-discharge static eliminator is configured to produce negative air ions in outside air, flowing on a surface of the self-discharge static eliminator, according to a positive potential charged to the first predetermined member. The transfer member connects a first connecting portion and a second connecting portion to each other such that an electric resistance between the first connecting portion and the second connecting portion is less than or equal to a third predetermined value. The first connecting portion is being a portion of the first predetermined member within a predetermined range in which elimination of static electricity is performed by the self-discharge static eliminator. The second connecting portion is a portion of the case.

In the vehicle, the first predetermined member may be a member that is easily electrostatically charged compared to a metal material.

In the vehicle, the first predetermined member may be a member made of a resin material.

In the vehicle, the vehicle may include a drive power source and a cover member covering the drive power source. The first predetermined member may be the cover member.

In the vehicle, the vehicle may include an engine. The engine may include a cylinder block, a cylinder head, and a head cover. The cylinder block may be provided with a plurality of cylinder bores. The cylinder head may be provided on the cylinder block so as to cover the cylinder bores. The head cover may be provided on the cylinder head so as to cover an outer surface of the cylinder head. The first predetermined member may be the head cover.

In the vehicle, the vehicle may include a drive power source and a duct configured such that outside air flows toward the drive power source. The first predetermined member may be the duct.

In the vehicle, the vehicle may include a first plate member. The first plate member may be provided on the case. The first predetermined member may be the first plate member.

In the vehicle, the first plate member may be a sound insulation cover covering at least a part of the case.

In the vehicle, the vehicle may include a second plate member. The second plate member may be provided on a second predetermined member that is different from the case. The first predetermined member may be the second plate member.

In the vehicle, the vehicle may include a drive power source and a duct configured such that outside air flows toward the drive power source. The second predetermined member may be one of the drive power source and the duct.

In the vehicle, the vehicle may include an engine. The engine may include a cylinder block, a cylinder head, and a head cover. The cylinder block may be provided with a plurality of cylinder bores. The cylinder head may be provided on the cylinder block so as to cover the cylinder bores. The head cover may be provided on the cylinder head so as to cover an outer surface of the cylinder head. The second predetermined member may be the head cover.

In the vehicle, the self-discharge static eliminator may include a main static eliminator and an auxiliary static eliminator. The main static eliminator may cover a predetermined area of an outer surface of the first predetermined member. The auxiliary static eliminator may cover a surface, that is different from a surface covered by the main static eliminator, of the outer surface of the first predetermined member. The auxiliary static eliminator may be configured to perform elimination of static electricity for the first predetermined member in addition to an amount of elimination of static electricity by the main static eliminator.

In the vehicle, the main static eliminator may include a discharge paint applied to the outer surface of the first predetermined member.

In the vehicle, the discharge paint may include at least one of a metal paint and a carbon paint.

In the vehicle, the vehicle may include a drive motor. The drive motor may be configured to output a torque by being supplied with electric power from the electric power control unit. The self-discharge static eliminator may be provided so as to have a surface area that is based on a predetermined criterion including a travel characteristic of the vehicle.

In the vehicle, the surface area may be an effective discharge area in which self-discharge occurs. The effective discharge area may be 10625 mm$^2$.

In the vehicle, one end of the transfer member may be connected to a portion of the case. A charged positive potential of the portion of the case is higher than a charged positive potential of the other portion of the case.

In the vehicle, the vehicle may include a predetermined device and a wire harness. The predetermined device may be electrically connected to the electric power control unit. The wire harness may connect the predetermined device and the electric power control unit to each other. The case may include a connection port. One end of the wire harness may be connected to the connection port. The one end of the transfer member may be connected to the case within a predetermined range from the connection port.

In the vehicle, the first connecting portion may be provided in a range within 100 mm from an outer edge of the self-discharge static eliminator.

A second aspect of the disclosure is a manufacturing method for a vehicle. The vehicle includes a vehicle body, a tire, a case, an electric power control unit, a first predetermined member, a self-discharge static eliminator, and a transfer member. The tire has an electric resistance value greater than or equal to a first predetermined value. The tire is held by the vehicle body. The case and the electric power control unit are mounted on the vehicle body. The electric power control unit includes at least one of an inverter and a converter. The self-discharge static eliminator is configured to produce negative air ions in outside air, flowing on a surface of the self-discharge static eliminator, according to a positive potential charged to the first predetermined member. The manufacturing method includes: housing the electric power control unit in the case; mounting the first predetermined member on the vehicle body such that an electric resistance between the first predetermined member and the vehicle body is greater than or equal to a second predetermined value; attaching the self-discharge static eliminator to the first predetermined member; and connecting a first connecting portion and a second connecting portion to each other via the transfer member such that an electric resistance between the first connecting portion and the second connecting portion is less than or equal to a third predetermined value. The first connecting portion is a portion of the first predetermined member within a first range determined in advance in which elimination of static electricity is performed by the self-discharge static eliminator. The second connecting portion is a portion of the case.

In the manufacturing method for the vehicle, the manufacturing method may further include connecting a drive motor to the electric power control unit, and attaching the self-discharge static eliminator with a first predetermined surface area to the first predetermined member. The drive motor may be configured to output a torque by being supplied with electric power from the electric power control unit. The first predetermined surface area may be a surface area of the self-discharge static eliminator that is determined based on a predetermined criterion including a travel characteristic of the vehicle.

In the manufacturing method for the vehicle, the manufacturing method may further include connecting a drive motor to the electric power control unit, and attaching an auxiliary static eliminator in a second range when a predetermined criterion is not satisfied in a state where a main static eliminator is attached to the first predetermined member. The drive motor may be configured to output a torque by being supplied with electric power from the electric power control unit. The predetermined criterion may include a travel characteristic of the vehicle. The second range may be a predetermined range from the first connecting portion in which the auxiliary static eliminator is attached so as to obtain a surface area that satisfies the predetermined criterion. The self-discharge static eliminator may include the main static eliminator and the auxiliary static eliminator. A surface area of the main static eliminator may be a second predetermined surface area. A surface area of the auxiliary static eliminator may be a surface area smaller than the second predetermined surface area.

According to the disclosure, the case housing the electric power control unit and the first predetermined member connected to the vehicle body in the state where the electric resistance between the first predetermined member and the vehicle body is greater than or equal to the second predetermined value are connected to each other via the transfer member. The self-discharge static eliminator configured to reduce the potential of the first predetermined member by elimination of static electricity according to the potential charged to the first predetermined member is provided, and one end of the transfer member is connected to the first predetermined member within the range in which the static elimination is performed by the self-discharge static eliminator. Accordingly, the static electricity charged to the electric power control unit is transferred to the portion, where the static elimination is performed by the self-discharge static eliminator, of the first predetermined member via the case and the transfer member so as to be neutralized and eliminated by the self-discharge static eliminator and the outside air. Therefore, since the potential of the static electricity charged to the electric power control unit can be reduced, it is possible to suppress that the static electricity affects electric power that is input to the electric power control unit and electric power that is output from the electric power control unit. That is, it is possible to suppress that the controllability of the electric power control unit is reduced or degraded.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle of this embodiment is a vehicle including an electric power control unit for controlling electric power that is supplied to a drive motor, an accessory, or the like, or electric power that is supplied from a drive motor, an accessory, or the like. For example, it is a hybrid vehicle having an engine and a drive motor as drive power sources, an electric vehicle having only a drive motor as a drive power source, or a vehicle having only an engine as a drive power source.

One example of the drive motor provided in the hybrid vehicle or the electric vehicle is a three-phase synchronous electric motor configured such that its output torque and rotational speed are controlled according to the magnitude and frequency of a supplied current. The three-phase synchronous electric motor is configured to generate electric power when it is forcibly rotated by external force in a state where a certain amount of current flows through it. That is, the drive motor is configured to be energized with AC current. On the other hand, a power supply for the drive motor is configured to output DC current and is configured to store, as DC current, electric power generated by the drive motor. Therefore, an inverter capable of conversion between DC current and AC current and a converter capable of voltage conversion of a voltage output from the power supply and a voltage to be input to the power supply are provided between the power supply and the drive motor. An electric power control unit S is constituted by these inverter and converter.

The vehicle having only the engine as the drive power source includes an alternator configured to convert a part of the power of the engine to AC electric power. On the other hand, a conventionally known battery for storing electric power generated by the alternator is configured to store the electric power as DC current. Therefore, an inverter for converting AC current to DC current is provided between the alternator and the battery. The inverter may be integrated with the alternator. The unit including the inverter is one example of an "electric power control unit" in the embodiment of the disclosure.

Figure 1:
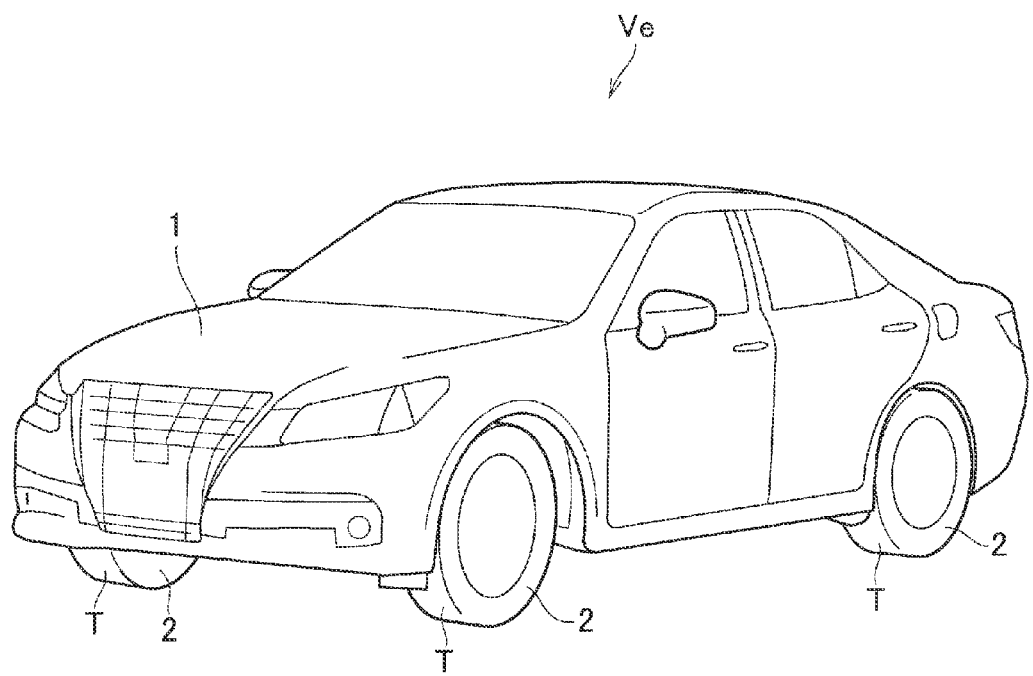
FIG. 1 is a perspective view for explaining the configuration of a vehicle in an embodiment of the disclosure.

FIG. 1 shows a configuration example of a vehicle to which the disclosure can be applied. A vehicle Ve is configured such that a vehicle body 1 forming the frame of the vehicle Ve and made of a metal material, a resin material, or the like is supported by tires 2 made of a material, such as rubber, having a high electric resistance. That is, the vehicle body 1 is held in an insulated state in which static electricity of the vehicle body 1 hardly flows to the road surface due to the electric resistance of the tires 2. Therefore, when static electricity is generated in the vehicle body 1 for some reason, the static electricity does not flow to the road surface, but is charged to the vehicle body 1. The electric resistance of the tires 2 is one example of a "first predetermined value" in the embodiment of the disclosure. Hereinbelow, a description will be given by citing as an example a hybrid vehicle including a drive motor (hereinafter referred to simply as a "motor").

Figure 2:
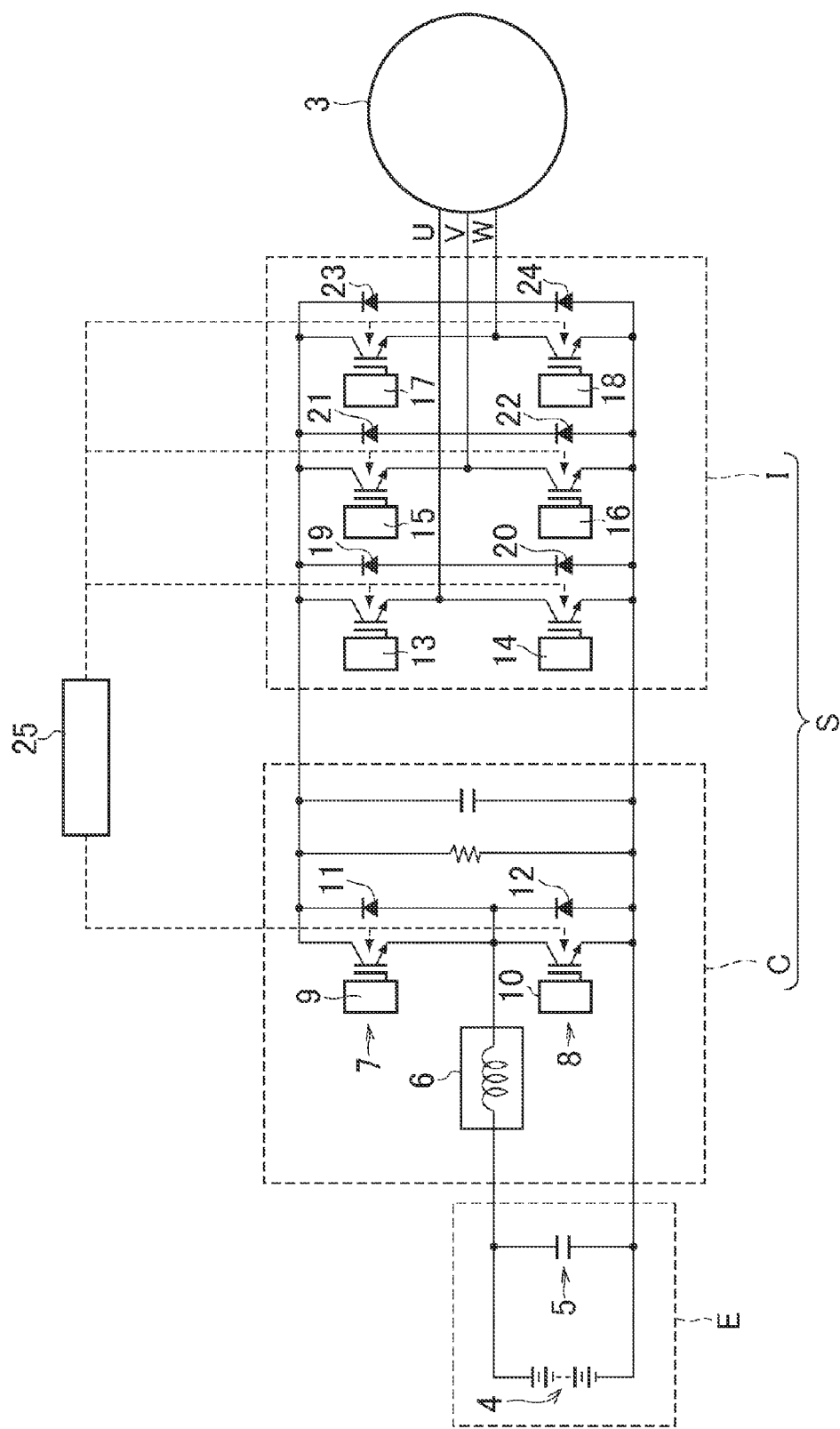
FIG. 2 is an electric circuit diagram for explaining the configuration of an electric circuit that supplies electric power to a drive motor.

FIG. 2 shows one example of an electric circuit that supplies electric power to a motor 3. In the example shown in FIG. 2, a battery 4 and a capacitor 5 are provided in parallel to each other. The battery 4 and the capacitor 5 function as a power supply E. A converter C that can increase the output voltage of the power supply E is connected to the power supply E. The converter C includes a reactor 6 for suppressing the fluctuation of current and two switches 7 and 8. One end of the reactor 6 is connected to a positive electrode of the power supply E. The other end of the reactor 6 is connected to an intermediate point between the switches 7 and 8 connected in series. The switches 7 and 8 include insulated gate bipolar transistors (hereinafter referred to as "IGBTs") 9 and 10 and diodes 11 and 12 that allow the flow of current through the IGBTs 9 and 10 in one direction. The IGBTs 9 and 10 are PWM-controlled. The IGBTs 9 and 10 are configured such that the voltage on the output side of the converter C (hereinafter referred to as the "inverter input voltage") is reduced when the on-duty of the IGBT 9 on the upper side in FIG. 2 is increased. The IGBTs 9 and 10 are further configured such that the inverter input voltage is increased when the on-duty of the IGBT 10 on the lower side in FIG. 2 is increased.

An inverter I is connected to the output side of the converter C. The inverter I converts DC current output from the power supply E to AC current and converts AC current generated by the motor 3 to DC current. The inverter I includes three parallel circuits. The three parallel circuits are configured in the same manner and each include two IGBTs 13 and 14, 15 and 16, or 17 and 18, and two diodes 19 and 20, 21 and 22, or 23 and 24. The three parallel circuits are respectively connected to the U phase, V phase, and W phase of the motor 3. Accordingly, by cooperatively controlling the on-duties of the IGBTs 13, 14, 15, 16, 17, and 18 to change the frequency of current that flows through each phase, the rotational speed of the motor 3 is controlled. An electronic control unit (hereinafter referred to as an "ECU") 25 is connected to the IGBTs 9, 10, 13, 14, 15, 16, 17, and 18. The ECU 25 is configured to control the IGBTs 9, 10, 13, 14, 15, 16, 17, and 18 according to signals detected by sensors (not shown).

Figure 3:
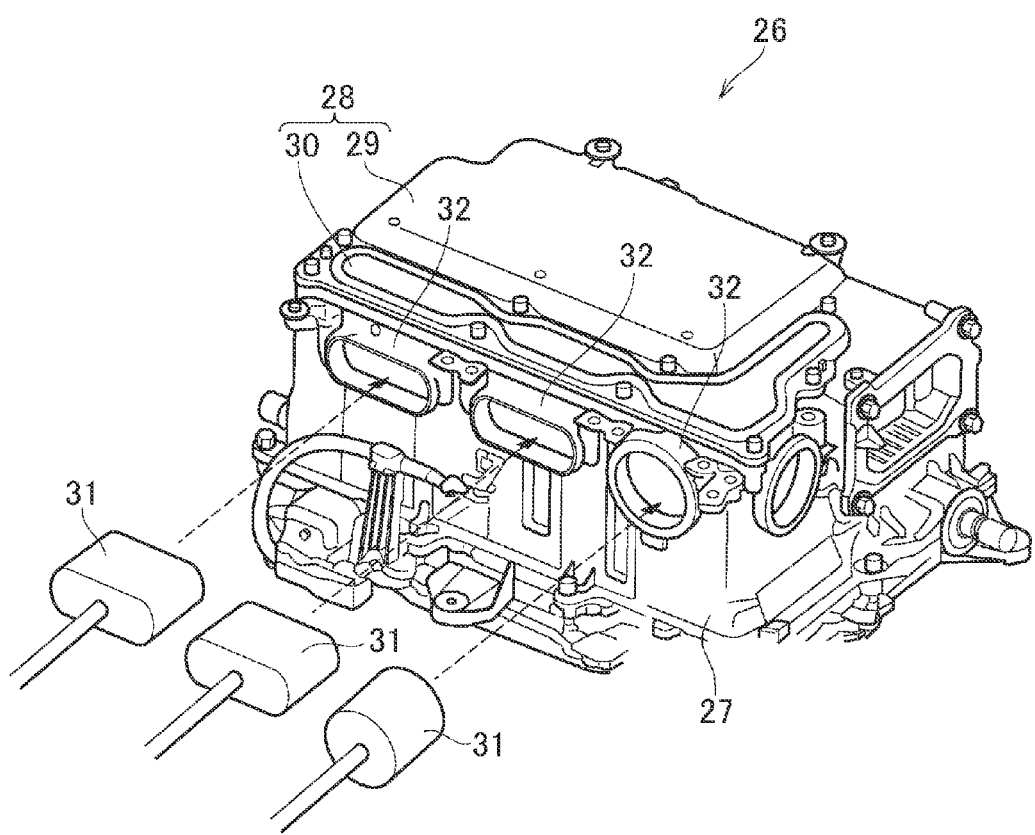
FIG. 3 is a perspective view for explaining an example of a case that houses an inverter and a converter.

FIG. 3 shows one example of a case 26 that houses the inverter I and the converter C. The case 26 includes a body portion 27 that is open upward, and a lid portion 28 that closes an opening of the body portion 27. The lid portion 28 includes a first lid portion 29 that closes a part of the opening of the body portion 27, and a second lid portion 30 that closes the other part of the opening of the body portion 27. The lid portions 29 and 30 are fixed to the body portion 27 by fastening members, such as bolts, with a seal (not shown) interposed therebetween. The body portion 27 is formed at its upper part with connection ports 32 for fixing wire harnesses 31 that are connected to the power supply E, the motor 3, and so on. The connection ports 32 are made of a resin material. The inverter I and the converter C are fixed to the inside of the body portion 27 configured as described above.

Figure 4:
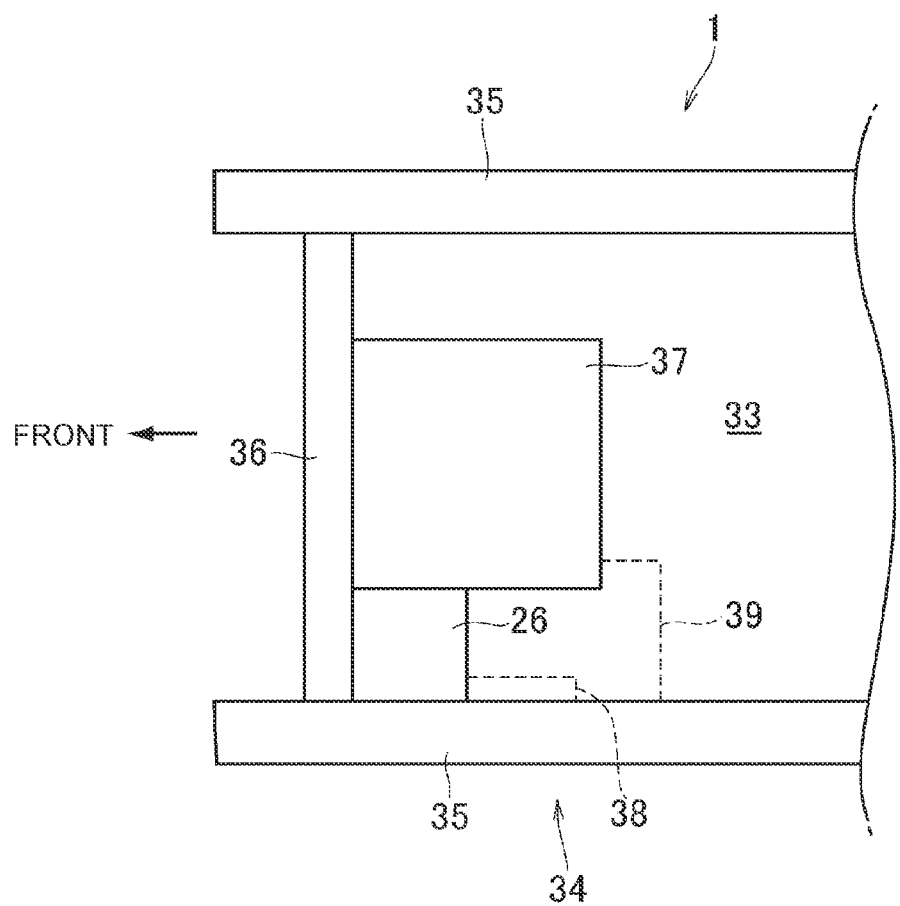
FIG. 4 is a schematic diagram for explaining a configuration example of attaching the case and an engine to a vehicle body.

FIG. 4 schematically shows a configuration of attaching the case 26 to the vehicle body 1. As shown in FIG. 4, the case 26 is disposed in an engine room 33 provided at the front of the vehicle body 1. Specifically, a front member 34 extending to the front of the vehicle body 1 and the case 26 are fixed together by fastening members such as bolts. The front member 34 includes conventionally known front side members 35 extending to the front of the vehicle body 1 on both sides in the vehicle width direction, and a member 36 with a relatively high rigidity that is connected to a member forming the frame of the front side members 35 and so on. In the engine room 33, an engine 37 is disposed adjacent to the case 26. The engine 37 is fixed to the front member 34 by engine mounts (not shown) and fastening members such as bolts. The case 26 and the engine 37 are electrically connected to the front member 34 via ground wires 38 and 39, respectively. The case 26 may be fixed to the engine 37 or a case of a transmission (not shown), to which the engine 37 is coupled, by fastening members such as bolts. Even in such a case, the case 26 is electrically connected to the front member 34 via the ground wire 38 or the like.

As described above, when controlling the inverter I and the converter C, the on-duty of current that is supplied to each of the IGBTs 9, 10, 13, 14, 15, 16, 17, and 18 is controlled, so that current energization and de-energization of the IGBTs 9, 10, 13, 14, 15, 16, 17, and 18 are repeatedly carried out. Accordingly, the inverter I and the converter C may generate static electricity due to the repetition of the current energization and de-energization described above so as to be electrostatically charged. Since the inverter I and the converter C are fixed to the inside of the case 26, the charges of static electricity generated as described above move to the case 26 and are charged to the electric power control unit S.

As described above, the case 26 is provided with the connection ports 32 made of the resin material, and the wire harnesses 31 for connection between the electric power control unit S and the devices such as the motor 3 are attached to the connection ports 32. Therefore, static electricity generated by the devices such as the motor 3 that are electrically connected to the electric power control unit S may be transferred to the electric power control unit S, so that the charges of static electricity transferred to the electric power control unit S move to the case 26 and are charged to the electric power control unit S. The device such as the motor 3 that is connected to the electric power control unit S via the wire harness 31 is one example of a "predetermined device" in the embodiment of the disclosure.

Since the case 26 is connected to the vehicle body 1 via the ground wire 38 and the bolts, the static electricity transferred to the case 26 is transferred to the vehicle body 1 according to an electric resistance between the case 26 and the vehicle body 1. That is, the vehicle body 1 and the case 26 are both electrostatically charged. When the case 26 is fixed to the engine 37 or the case of the transmission and further is electrically connected to the front member 34 via the ground wire 38, the static electricity of the case 26 is transferred to the vehicle body 1 according to an electric resistance of the ground wire 38 between the case 26 and the front member 34 and an electric resistance between the case 26 and the vehicle body 1 via the engine 37 or the case of the transmission. In this way, the vehicle body 1 and the case 26 are both electrostatically charged. The potential of static electricity charged to the case 26 becomes higher than the potential of static electricity charged to the vehicle body 1.

When the electric power control unit S and the case 26 are electrostatically charged as described above, the response from an accelerator operation to a change in driving force, the output torque of the motor 3, or the response from a brake operation to an increase in braking force by the motor 3 may be decreased. That is, the travel performance may be degraded. This is considered to be because the static electricity affects the controllability and output electric power of the electric power control unit S.

During the travel of the vehicle Ve, tread surfaces T of the tires 2 repeatedly come into contact with the road surface and repeatedly separate from the road surface. When the tread surfaces T of the tires 2 come into contact with the road surface or separate from the road surface, static electricity may be generated in the tires 2, so that the tires 2 may be electrostatically charged. Further, sliding portions between pistons and cylinder bores provided in the engine 37 and sliding portions of gears forming the transmission may also generate static electricity due to sliding, so that the vehicle body 1 may be electrostatically charged. The vehicle body 1 is charged mainly with positive static electricity.

When the vehicle body 1 is electrostatically charged, since repulsive force is generated between positive static electricity of the vehicle body 1 and positive air ions, there is a possibility that the air may separate from the vehicle body 1 to flow. When the air separates from the vehicle body 1 to flow, there is a possibility that the acceleration, the steerability, and so on may be decreased.

In order to eliminate the static electricity described above, a self-discharge static eliminator is provided in the embodiment of the disclosure. The self-discharge static eliminator is configured to generate corona discharges according to the potential of the self-discharge static eliminator. When the corona discharges are generated from the self-discharge static eliminator, negative ions are produced in the outside air flowing on the surface of the self-discharge static eliminator, so that static electricity around the self-discharge static eliminator is neutralized by the negative ions so as to be eliminated. As is conventionally known, a corona discharge is generated from a sharp or pointed portion. As one example, the self-discharge static eliminator that can generate such corona discharges can be configured such that a paint containing fine metal materials (hereinafter referred to as a "metallic paint") or a paint containing carbon fibers (hereinafter referred to as a "carbon paint") is applied to a member as a discharge object. The metal materials contained in the metallic paint each have a shape obtained by bending a disk into a U-shape in cross section, and corona discharges are considered to occur from edges of the disks. In the case of the carbon paint, corona discharges are considered to occur from leading ends of the carbon fibers contained in the carbon paint.

As another example, the self-discharge static eliminator can be configured such that a sheet made of a material, such as gold, silver, copper, or aluminum, having a high electric conductivity is attached to a member as a discharge object using an adhesive that can conduct static electricity. Since a corona discharge is generated from a sharp or pointed portion, extremely thin projections are preferably formed on a surface of the sheet by knurling, hairline finish, or the like.

When the sheet is formed in this way, corona discharges are generated from the projections and the outer edge of the sheet.

When the corona discharges are generated from the self-discharge static eliminator as described above, air ions with the polarity opposite to that of static electricity charged to the self-discharge static eliminator are produced in the outside air (the atmosphere or air) around the self-discharge static eliminator. The outside air containing the air ions produced by the corona discharges flows around the self-discharge static eliminator, so that the static electricity of the member as the discharge object is neutralized and eliminated. That is, the potential difference between the air ions and the member as the discharge object is reduced. The range in which the static electricity can be neutralized and eliminated by the self-discharge static eliminator configured as described above has been confirmed by experiments to be a range in which the distance from the outer edge of the self-discharge static eliminator is 100 mm or less. It is considered that the discharge amount changes according to the amount of the metal materials contained in the paint, the amount of the fibers contained in the paint, the number of the projections formed on the sheet, or the like. Therefore, the range of the static elimination by the self-discharge static eliminator may be determined by experiments or the like according to the configuration of the self-discharge static eliminator.

In the corona discharges described above, the discharge amount increases as the potential of static electricity charged to the self-discharge static eliminator becomes higher. Therefore, in the embodiment of the disclosure, the self-discharge static eliminator is attached to a "first predetermined member" that is electrostatically charged more easily than a metal material, and conduction is established to allow static electricity to flow from the case 26 to the first predetermined member.

The first predetermined member is an engine cover made of a resin material, a cylinder head cover made of a resin material, a duct (or an air hose) that is made of a resin material and allows the outside air to flow through toward an engine, or the like. The engine cover is one example of a "cover member" in the embodiment of the disclosure, and the cylinder head cover is one example of a "head cover" in the embodiment of the disclosure. Hereinbelow, a description will be given of a configuration in which the self-discharge static eliminator is attached to the engine cover.

Figure 5:
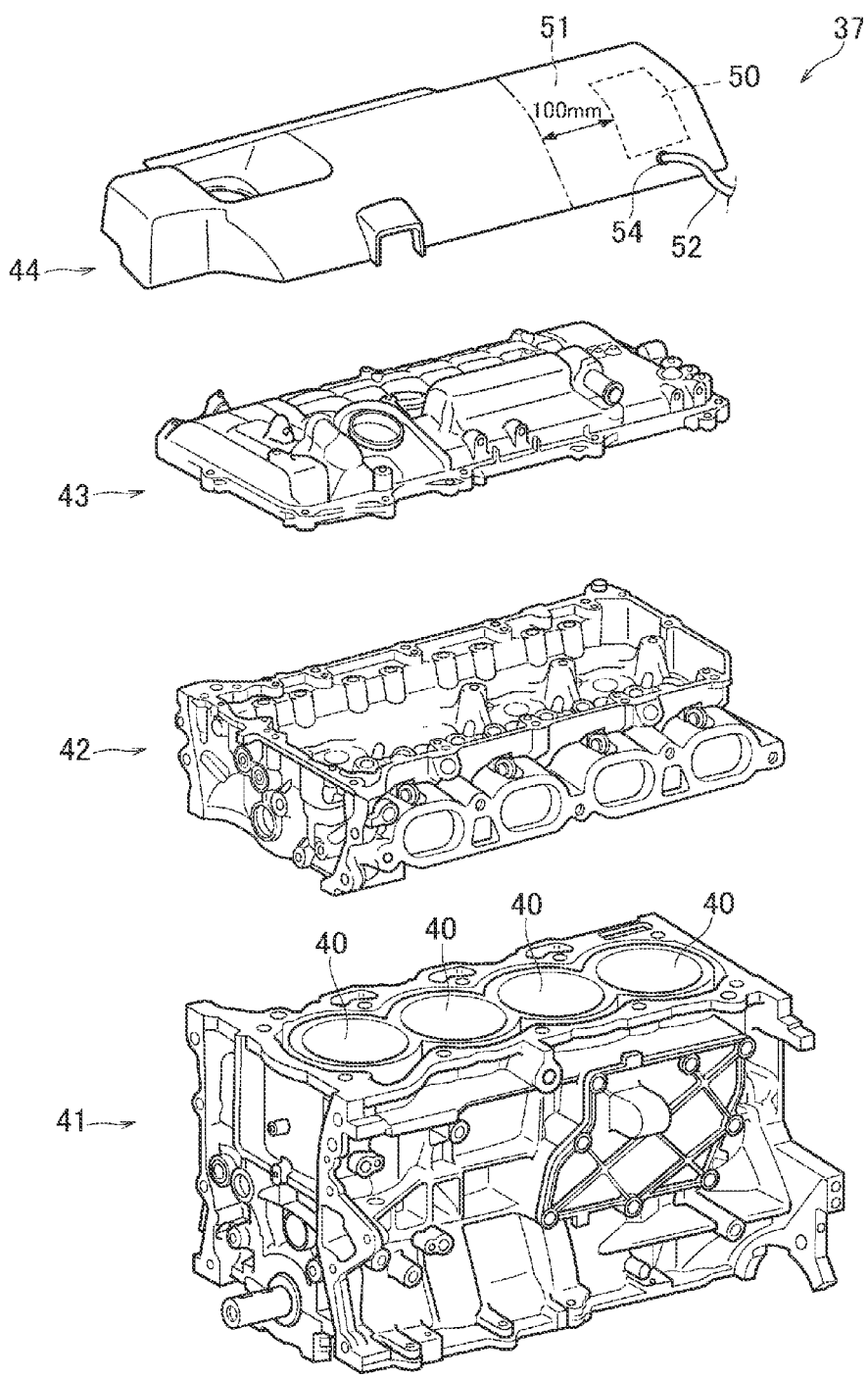
FIG. 5 is a schematic diagram for explaining the configuration of the engine.

FIG. 5 is a schematic diagram for explaining the configuration of the engine 37. The engine 37 shown in FIG. 5 includes a cylinder block 41 formed with a plurality of cylinder bores 40 and open upward, a cylinder head 42 closing an opening of the cylinder block 41 and having ignition devices (not shown) and valves (not shown), and a cylinder head cover 43 covering an upper portion of the cylinder head 42. An engine cover 44 for making the appearance better or so is attached on the upper side of the cylinder head cover 43. The engine cover 44 is made of a resin material, such as polypropylene, that is easily electrostatically charged compared to a metal material. While an upper surface of the engine cover 44 is shown to be a smooth surface in FIG. 5 for convenience, it may be formed to be uneven for a decorative purpose or the like.

Figure 6:
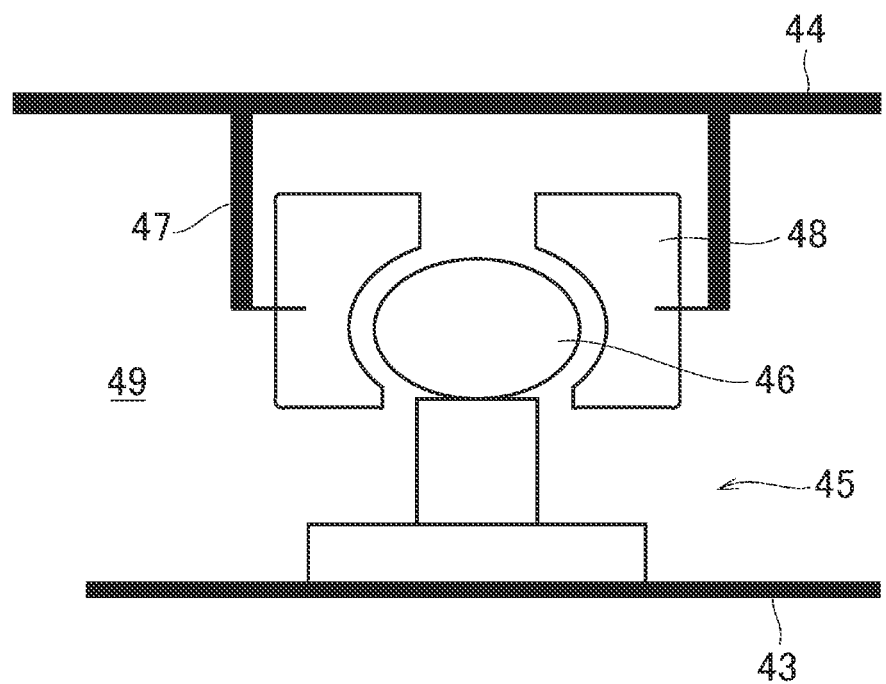
FIG. 6 is a schematic diagram for explaining an example of a structure in which a cylinder head cover and an engine cover are attached to each other.

The engine cover 44 is configured to be fixed to the cylinder head cover 43. FIG. 6 is a schematic diagram for explaining one example of a structure in which the cylinder head cover 43 and the engine cover 44 are attached to each other. In the configuration shown in FIG. 6, a projecting portion 45 made of a metal material is integrated with an upper surface of the cylinder head cover 43. The cylinder head cover 43 and the projecting portion 45 may be integrated with each other, for example, by forming a female screw in the cylinder head cover 43, providing the projecting portion 45 with a male screw projecting on the cylinder head cover 43 side, and fastening the male screw into the female screw. Alternatively, the projecting portion 45 may be bonded to the cylinder head cover 43 using a double-sided tape.

The projecting portion 45 is formed at its leading end with a spherical head portion 46, while the engine cover 44 is formed at its lower surface with a recessed portion 47 that is fitted to the head portion 46. More specifically, a hollow cylindrical clamp portion 48 made of rubber is integrated with an inner surface of the recessed portion 47, and the head portion 46 is fitted into the clamp portion 48, so that the engine cover 44 is attached to the cylinder head cover 43. When the engine cover 44 and the cylinder head cover 43 are assembled together in this way, a gap 49 is formed between the lower surface of the engine cover 44 and the upper surface of the cylinder head cover 43 such that the air introduced into the engine room 33 can flow in the gap 49. It is to be noted that a plurality of projecting portions 45 and a plurality of corresponding recessed portions 47 are formed on the outer edges of the cylinder head cover 43 and the engine cover 44.

Since the engine cover 44 configured as described above is attached to the engine 37 via the hollow cylindrical clamp portion 48 made of rubber having a low electrostatic conductivity, it is difficult for static electricity of the engine cover 44 to flow to the vehicle body 1 or the engine 37. In other words, the electric resistance between the vehicle body 1 and the engine cover 44 is of a degree that does not allow static electricity to flow from the engine cover 44 to the vehicle body 1. This electric resistance may be equal to or different from that between the vehicle body 1 and the road surface. This electric resistance is one example of a "second predetermined value" in the embodiment of the disclosure. Therefore, when static electricity is transferred from some member to the engine cover 44 or static electricity is generated in the engine cover 44, the static electricity is charged to the engine cover 44. That is, since much of the static electricity is charged to the engine cover 44, the potential of the engine cover 44 becomes high.

The engine cover 44 is configured to cover the upper side of the engine 37, and the area of its relatively smooth (small unevenness) surface is large. Therefore, a metallic paint for discharge is applied to a smooth surface in the lower surface of the engine cover 44, and a sheet for discharge is attached in the vicinity of the portion where the metallic paint is applied. That is, a self-discharge static eliminator 50 is formed by the metallic paint and the sheet. A portion where the self-discharge static eliminator 50 is attached is shown by a broken line in FIG. 5. The self-discharge static eliminator 50 may be either one of the paint and the sheet.

In the case where the self-discharge static eliminator 50 is attached to the engine cover 44 as described above, when static electricity is charged in a predetermined range from the portion, where the self-discharge static eliminator 50 is attached, of the engine cover 44, corona discharges occur according to the potential of the charged static electricity, so that air ions with the polarity opposite to that of the static electricity charged to the engine cover 44 are produced in the outside air around the self-discharge static eliminator 50. Then, the air ions are attracted to the self-discharge static eliminator 50, so that the static electricity charged to the engine cover 44 around the self-discharge static eliminator 50 is neutralized and eliminated.

One end of a lead wire 52 composed of a copper wire for making the electric resistance low is electrostatically connected to the engine cover 44 in a predetermined range (hereinafter referred to as a "static elimination region") 51 where static electricity is eliminated by the self-discharge static eliminator 50. The static elimination region 51 is one example of a "first range" in the embodiment of the disclosure and is shown by a two-dot chain line in FIG. 5. The other end of the lead wire 52 is electrostatically connected to the case 26. That is, the static elimination region 51 and the case 26 are electrostatically connected to each other. Instead of the lead wire 52, a plate member made of a material, such as a metal material, having a high electric conductivity may be connected between the engine cover 44 and the case 26.

Figure 7:
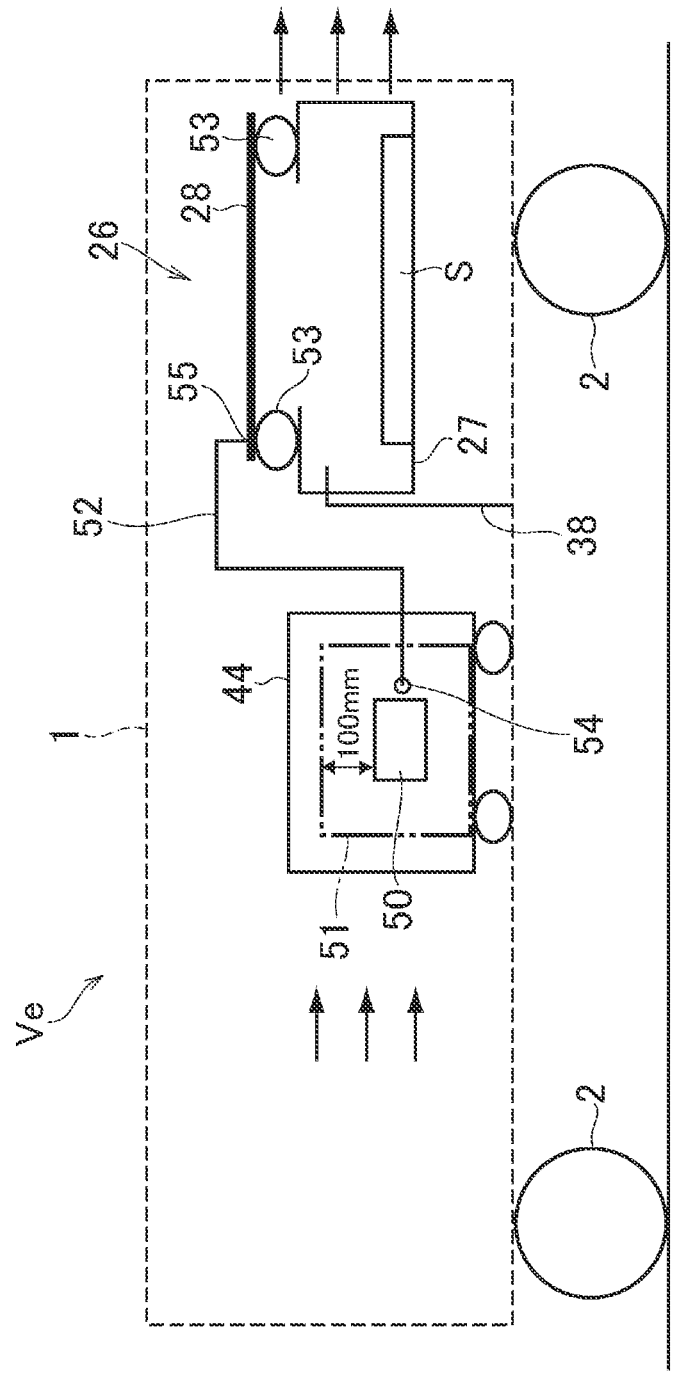
FIG. 7 is a schematic diagram showing an electrical connection relationship between the vehicle body, an electric power control unit, the case, a lead wire, and the engine cover.

FIG. 7 schematically shows the electrical connection relationship between the vehicle body 1, the electric power control unit S, the case 26, the lead wire 52, and the engine cover 44. As described above, the electric resistance between the vehicle body 1 and the engine cover 44 is of a degree that does not allow static electricity to flow from the engine cover 44 to the vehicle body 1. Therefore, the five members described above are electrically connected in the order described above. In the example shown herein, an insulating seal member 53 is interposed between the body portion 27 and the lid portion 28. In the example shown in FIG. 7, the flow of the outside air is shown by arrows, and it is configured that the outside air flowing along the surface of the engine cover 44 flows to the outside of the vehicle. That is, the space where the engine cover 44 is provided is not sealed.

A portion 54 where the lead wire 52 is connected to the engine cover 44 in FIG. 7 is one example of a "first connecting portion" in the embodiment of the disclosure, a portion 55 where the lead wire 52 is connected to the case 26 in FIG. 7 is one example of a "second connecting portion" in the embodiment of the disclosure, and the lead wire 52 is one example of a "transfer member" in the embodiment of the disclosure.

A method for connection between the engine cover 44 and the lead wire 52 and a method for connection between the case 26 and the lead wire 52 are not particularly limited. For example, an annular connecting member may be attached to each end of the lead wire 52, and a bolt may be inserted through the connecting member so as to sandwich the connecting member between a head portion of the bolt and the engine cover 44 or the case 26. Alternatively, the engine cover 44 and the case 26 may each be formed with a projecting portion, a clip may be attached to each end of the lead wire 52, and the projecting portion may be clamped by the clip. When using the clip in this way, conductive grease such as grease containing copper is preferably applied to a clamping portion so as to make the electric resistance of the clamping portion low.

Since, as described above, the static elimination region 51 is the region, where static electricity is eliminated by the self-discharge static eliminator 50, of the engine cover 44, the potential of the static elimination region 51 becomes low. Therefore, when static electricity is charged to the electric power control unit S, the static electricity flows to the static elimination region 51 from the electric power control unit S via the lead wire 52 and the case 26 according to a potential difference between the static elimination region 51 and the electric power control unit S. That is, the charges move from the electric power control unit S to the static elimination region 51. Therefore, the static electricity charged to the electric power control unit S can be eliminated via the engine cover 44.

Figure 8:
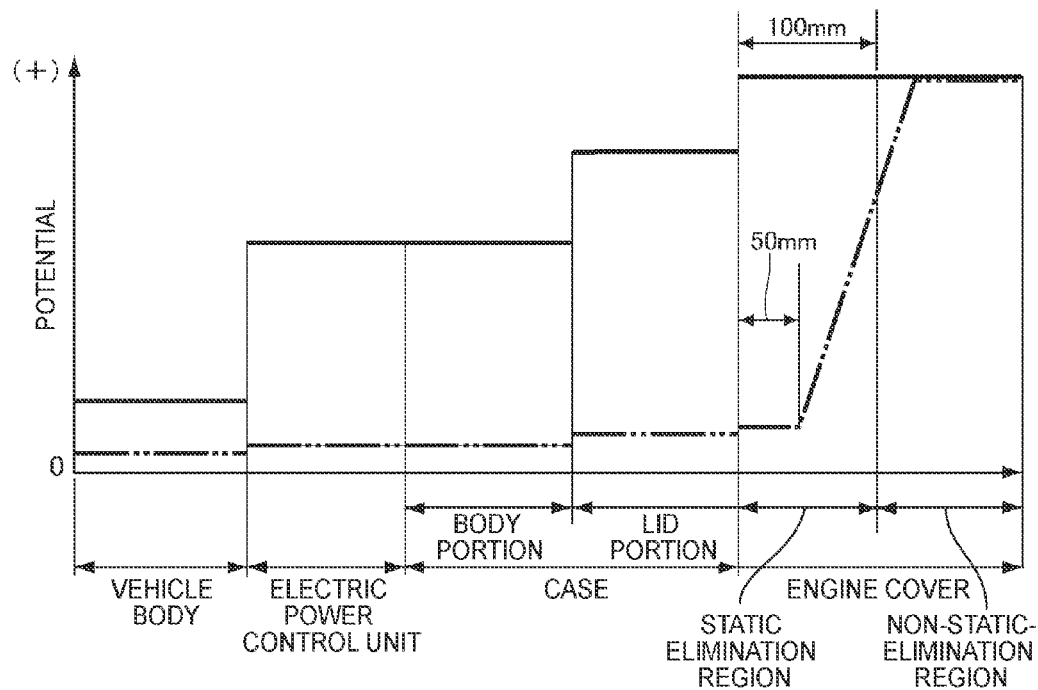
FIG. 8 is a graph for explaining static elimination actions.

FIG. 8 is a graph for explaining the static elimination actions described above. The ordinate axis of the graph shown in FIG. 8 represents the potential of static electricity. The abscissa axis of the graph shown in FIG. 8 represents the respective portions of the vehicle Ve. The graph of FIG. 8 shows the vehicle body 1, the electric power control unit S, the case 26, and the engine cover 44 in the order from left to right. The column showing the case 26 further shows the body portion 27 of the case 26 and the lid portion 28 of the case 26. The column showing the engine cover 44 further shows the static elimination region 51 and a region around the static elimination region 51 (hereinafter referred to as a "non-static-elimination region"). Further, in the static elimination region 51, there is specified a region where the static elimination effect is most excellent (within 50 mm from the outer edge of the self-discharge static eliminator 50). In FIG. 8, solid lines indicate potentials when the self-discharge static eliminator 50 is not provided, while two-dot chain lines indicate potentials when the self-discharge static eliminator 50 is provided.

First, the potentials when the self-discharge static eliminator 50 is not provided will be described. The vehicle body 1 that is held in the electrostatically insulated state from the road surface due to the tires 2 made of the rubber material as described above is charged with static electricity, such as static electricity transferred from the devices electrically connected to the vehicle body 1, static electricity generated by friction with vehicle traveling wind, or static electricity generated due to separation of the tires 2 from the road surface during rotation of the tires 2. The electric power control unit S is configured to use the vehicle body 1 as the ground earth. Therefore, when static electricity is generated by the operation of the electric power control unit S and so on, the static electricity partially flows to the vehicle body 1. On the other hand, since there is an unavoidable electric resistance greater than or equal to the second predetermined value between the vehicle body 1 and the electric power control unit S, the potential of the electric power control unit S becomes higher than that of the vehicle body 1.

Since the electric power control unit S is connected to the body portion 27 of the case 26, static electricity generated in the electric power control unit S is transferred to the body portion 27 of the case 26, and further, as described above, static electricity is transferred to the body portion 27 of the case 26 from the motor 3 and so on via the connection ports 32. Accordingly, the body portion 27 of the case 26 is also maintained at a relatively high potential. In FIG. 8, the potentials of the electric power control unit S and the body portion 27 of the case 26 are shown to be approximately equal to each other. While static electricity is charged also to the lid portion 28 connected to the body portion 27 of the case 26 and is transferred to the body portion 27 of the case 26, the potential of the lid portion 28 of the case 26 becomes higher than that of the body portion 27 of the case 26 due to an electric resistance between the lid portion 28 and the body portion 27 (i.e. an electric resistance of the insulating seal member 53) and so on.

The case 26 is connected to the static elimination region 51 of the engine cover 44 via the lead wire 52. Since the engine cover 44 is connected to the cylinder head cover 43 via the clamp portion 48 made of the rubber material, the electric resistance between the engine cover 44 and the cylinder head cover 43 is high, and since the engine cover 44 is made of the resin material, its electric conductivity is low. Therefore, static electricity transferred from the case 26 to the static elimination region 51 of the engine cover 44 via the lead wire 52 is hardly transferred to the cylinder head cover 43 and thus is charged to the engine cover 44. Since the engine cover 44 is made of the resin material, its charge amount becomes large, so that the potential of the static elimination region 51 of the engine cover 44 becomes higher than those of the body portion 27 and the lid portion 28 of the case 26. The lead wire 52 is formed to have a relatively low electric resistance of a degree that can allow static electricity of the lid portion 28 to sufficiently move to the static elimination region 51 of the engine cover 44. This electric resistance is one example of a "third predetermined value" in the embodiment of the disclosure.

Next, the actions when the self-discharge static eliminator 50 is provided to the engine cover 44 will be described with reference to FIG. 8. First, when the self-discharge static eliminator 50 is provided to the engine cover 44, the potential of the static elimination region 51 is reduced due to the static neutralization/elimination action by the self-discharge static eliminator 50. It has been confirmed by experiments that the potential in the range within 50 mm from the outer edge of the self-discharge static eliminator 50 is reduced to a value that is approximately equal to that at the position where the self-discharge static eliminator 50 is provided. In FIG. 8, that region is specified as "50 mm". When the potential of the static elimination region 51 is reduced as described above, as the distance from the self-discharge static eliminator 50 increases, the potential is increased at positions located away from the outer edge of the self-discharge static eliminator 50 by more than 50 mm in the static elimination region 51. On the other hand, in the non-static-elimination region, the potential is reduced as approaching the static elimination region 51. This is because although the engine cover 44 is made of the low electric conductivity material, static electricity flows so as to reduce the potential difference with respect to an adjacent portion.

When the potential of the static elimination region 51 is reduced as described above, the potential of the lid portion 28 becomes higher than that of the static elimination region 51, so that static electricity charged to the lid portion 28 is transferred to the static elimination region 51 of the engine cover 44 via the lead wire 52. That is, the potential of the static electricity charged to the lid portion 28 is reduced. Then, corona discharges occur from the self-discharge static eliminator 50 due to the static electricity transferred to the static elimination region 51 of the engine cover 44, so that the static electricity in the static elimination region 51 is neutralized and eliminated. Since the lowest potential is achieved in the range within 50 mm from the outer edge of the self-discharge static eliminator 50 as described above, the end of the lead wire 52 is preferably attached to a portion within 50 mm from the outer edge of the self-discharge static eliminator 50 or may be attached directly to the self-discharge static eliminator 50.

When the potential of the lid portion 28 is reduced as described above, the potentials of the body portion 27 of the case 26, the electric power control unit S, and the vehicle body 1 are reduced. The principle that the potentials of the body portion 27 of the case 26, the electric power control unit S, and the vehicle body 1 are reduced is the same as the principle that the potential of the lid portion 28 is reduced.

As a result, the static electricity charged to the electric power control unit S and the vehicle body 1 is transferred to the static elimination region 51 of the engine cover 44 via the body portion 27 of the case 26, the lid portion 28 of the case 26, and the lead wire 52 and is neutralized and eliminated by the self-discharge static eliminator 50 and the outside air. Accordingly, since the potentials of the static electricity charged to the electric power control unit S and the vehicle body 1 can be reduced, it is possible to suppress that the static electricity affects electric power that is input to the electric power control unit S and electric power that is output from the electric power control unit S. That is, it is possible to suppress that the controllability of the electric power control unit S is reduced or degraded. Consequently, it is possible to suppress that the driving force (including the braking force) based on an accelerator operation or a brake operation and the output torque of the motor 3 deviate from each other, or it is possible to control the output torque of the motor 3 in response to such an operation. As a result, it is possible to quickly output driving force or braking force intended by a driver and thus to suppress giving a sense of incongruity to the driver.

By reducing the potential of the static electricity charged to the vehicle body 1, it is possible to suppress the generation of repulsive force between the static electricity and the air flowing on the surface of the vehicle body 1. Therefore, it is possible to obtain the aerodynamic characteristics that are determined on design. As a result, since the aerodynamic characteristics intended on design can be achieved, it is possible to suppress degradation of the travel performance such as the acceleration and the steerability.

The inventor has performed a driving test while gradually changing the effective discharge area of the self-discharge static eliminator 50, thereby verifying whether or not there is an optimal value of the effective discharge area of the self-discharge static eliminator 50. The effective discharge area is a surface area of a surface where there is a possibility of corona discharges from the self-discharge static eliminator 50, and changes depending on the design shape of the surface to which the self-discharge static eliminator 50 is attached. That is, the effective discharge area is different from an area that is calculated from the external dimensions of the self-discharge static eliminator 50.

Figure 9:
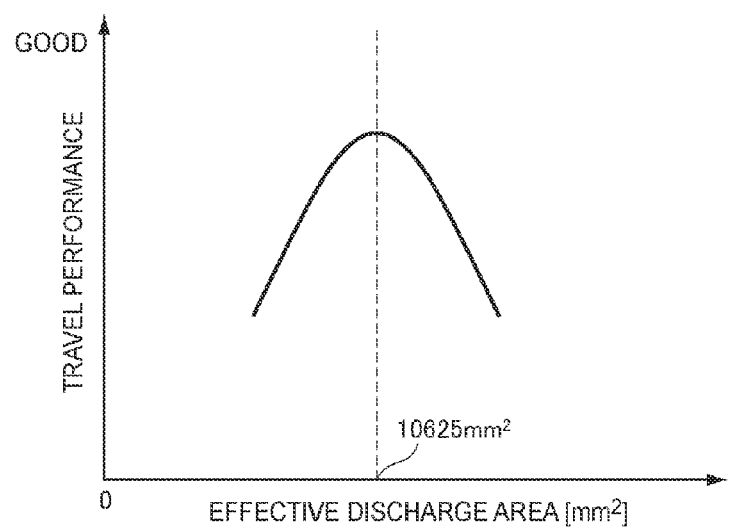
FIG. 9 is a graph showing a relationship between the effective discharge area of a self-discharge static eliminator and the travel performance.

FIG. 9 is a graph showing the results of the driving test. In FIG. 9, the abscissa axis represents the effective discharge area, while the ordinate axis represents the travel performance. The travel performance represents a response time from when the acceleration/deceleration request amount by an accelerator operation, a brake operation, or the like is changed. The travel performance can be determined to be better as the response time from when the acceleration/deceleration request amount is changed becomes shorter, and is shown on a higher side of the ordinate axis as the response time becomes shorter. That is, as going upward along the ordinate axis, it means that the response time becomes shorter.

From the verification results shown in FIG. 9, it is seen that when the effective discharge area is less than or equal to a predetermined area, the travel performance becomes better as the effective discharge area increases. This is considered to be because the discharge amount from the self-discharge static eliminator 50 increases as described above.

On the other hand, it is seen that when the effective discharge area is greater than the predetermined area, the travel performance is degraded as the effective discharge area increases. This is considered to be because when the effective discharge area is greater than the predetermined area, once corona discharges are generated, corona discharges do not occur until the potential of the self-discharge static eliminator 50 increases to a certain degree again. In other words, this is considered to be because corona discharges do not occur temporarily. In contrast, when the effective discharge area is less than or equal to the predetermined area, the reason is considered that even if corona discharges are once generated to reduce the potential of the self-discharge static eliminator 50, corona discharges continue to occur.

Therefore, there is an optimal value of the effective discharge area as shown in FIG. 9, and, in order to continuously generate corona discharges, in other words, in order to continuously exhibit the static neutralization/elimination effect, it is preferable to form the self-discharge static eliminator 50 such that its effective discharge area becomes equal to the optimal value. The optimal value of the effective discharge area is approximately the same regardless of whether the vehicle is the hybrid vehicle, the electric vehicle, or the vehicle having only the engine as the drive power source. Further, it has been confirmed that the optimal value of the effective discharge area is approximately the same regardless of the vehicle model. Specifically, when the self-discharge static eliminator 50 of 85 mm in width and 125 mm in length was used, the travel performance was most excellent. That is, the optimal value of the effective discharge area was 10625 mm$^2$.

When the self-discharge static eliminator 50 is formed by applying the metallic paint to the engine cover 44, there is an error of the powdery metal contained in the metallic paint. When the self-discharge static eliminator 50 is formed by attaching the sheet to the engine cover 44, there is a manufacturing error of the projections such as hairlines formed on the sheet. Therefore, with respect to "10625 mm$^2$" in the embodiment of the disclosure, the magnitude of the area may be changed corresponding to an error of a degree that can be recognized by those skilled in the art or that can be allowed for practical use.

Even by applying the paint or attaching the sheet so as to achieve a predetermined effective discharge area of the self-discharge static eliminator 50, there is a possibility that the intended effective discharge area is not achieved due to a manufacturing error or the like. Therefore, when providing the self-discharge static eliminator 50 to the engine cover 44 or the like, a main self-discharge static eliminator 50 may be attached and then a self-discharge static eliminator 50 for adjustment may be attached.

Specifically, first, a paint for discharge is applied to the engine cover 44 such that the effective discharge area, assuming that the effective discharge area increases due to a manufacturing error, becomes 10625 mm$^2$, and that the connecting portion 54 of the lead wire 52 is located within a range in which the static elimination effect of the paint for discharge is generated. Then, a driving test is performed in this state. This driving test will be referred to as a "first driving test". A self-discharge static eliminator 50 formed by applying the paint to the engine cover 44 as described above is one example of a "main static eliminator" in the embodiment of the disclosure.

Then, a sheet for discharge having a predetermined size is attached to the engine cover 44 such that the connecting portion 54 of the lead wire 52 is located within a range in which the static elimination effect of the sheet is generated, and a driving test is performed in this state. This driving test will be referred to as a "second driving test". When the travel performance in the second driving test is degraded compared to the travel performance in the first driving test, the effective discharge area of a surface to which the paint is applied is presumed to be the optimal value of 10625 mm$^2$. Therefore, by detaching the added sheet, the substantial effective discharge area of the self-discharge static eliminator 50 can be adjusted to the optimal value.

On the other hand, when the travel performance in the second driving test is improved compared to the travel performance in the first driving test, a sheet is further added, and the same driving test as described above is performed repeatedly. By performing the driving test repeatedly and detaching the sheet attached in the driving test where the travel performance is degraded, the substantial effective discharge area of the self-discharge static eliminator 50 can be adjusted to the optimal value. By providing the sheet as an auxiliary or adjusting self-discharge static eliminator 50 as described above, the effective discharge area of the entire self-discharge static eliminator 50 can be adjusted to the proper area even with manufacturing errors of the paint and the sheet. The sheet for adjusting the effective discharge area to the optimal value as described above is one example of an "auxiliary static eliminator" in the embodiment of the disclosure.

When static electricity of the static elimination region 51 of the engine cover 44 is eliminated by the self-discharge static eliminator 50 as described above, it is considered that static electricity is transferred from the case 26 to the static elimination region 51 according to a potential difference between the potential of the static elimination region 51 and the potential of the case 26. Therefore, it is considered to be preferable that a portion, where much static electricity is charged, of the case 26 and the lead wire 52 be connected to each other.

Accordingly, the inventor has clarified a relationship between the potential charged to the case 26 and the travel performance by a driving test. As described above, the electric resistance exists between the lid portion 28 and the body portion 27 of the case 26. Since the connection ports 32 are provided near the lid portion 28, a number of lead wires for supplying electric power to the motor 3 and so on are disposed near the lid portion 28. Therefore, the potential of static electricity of the lid portion 28 is presumed to be higher than the potential of static electricity of the body portion 27 due to the electric resistance between the lid portion 28 and the body portion 27 and static electricity of the lead wires connected to the motor 3 and so on. Accordingly, herein, the driving test was performed by selecting three points (point A, point B, point C) on the lid portion 28 of the case 26 in the order in which the distance from the connection port 32 increases, and by connecting lead wires 52 to those three points, respectively, thereby verifying the change in travel performance.

Figure 10:
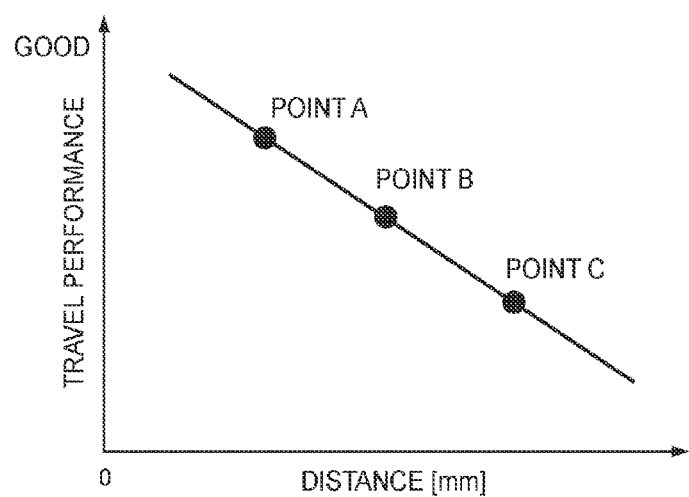
FIG. 10 is a graph showing a relationship between the position of attaching the lead wire to the case and the travel performance.

FIG. 10 is a graph showing the results of the driving test. In FIG. 10, the abscissa axis represents the distance from the connection port 32, while the ordinate axis represents the travel performance, wherein the travel performance is shown on a higher side of the ordinate axis as it becomes better. Like the travel performance shown in FIG. 9, the travel performance shown in FIG. 10 represents a response time from when the acceleration/deceleration request amount by an accelerator operation, a brake operation, or the like is changed. The travel performance shown in FIG. 10 can be determined to be better as the response time from when the acceleration/deceleration request amount is changed becomes shorter, and is shown on a higher side of the ordinate axis as the response time becomes shorter. That is, as going upward along the ordinate axis, it means that the response time is improved.

From the driving test described above, it is seen that the travel performance becomes better as the position of connecting the lead wire 52 approaches the connection port 32.

Therefore, it is preferable to connect the lead wire 52 to a portion, where the potential of static electricity is high, of the lid portion 28. Alternatively, it is preferable to connect the lead wire 52 to the lid portion 28 within a predetermined range from the connection port 32.

Herein, a method of manufacturing the vehicle Ve will be described.

First, like a conventionally known vehicle, the case 26 housing the electric power control unit S, the tires 2, and so on are attached to the vehicle body 1, and the engine cover 44 is attached to the cylinder head cover 43 such that the electric resistance between the engine cover 44 and the vehicle body 1 is of a degree that does not allow static electricity to flow through. In this state, the self-discharge static eliminator 50 is attached to the engine cover 44, and a portion, where static electricity is neutralized and eliminated by the self-discharge static eliminator 50, of the engine cover 44 and the case 26 are connected to each other via the transfer member such as the lead wire 52.

When the effective discharge area of the self-discharge static eliminator 50 to be attached to the engine cover 44 is determined in advance by experiments or the like, the self-discharge static eliminator 50 is attached to the engine cover 44 so as to have the predetermined effective discharge area.

On the other hand, when the effective discharge area of the self-discharge static eliminator 50 to be attached to the engine cover 44 is not determined in advance, a main static eliminator with a predetermined surface area is attached to the engine cover 44. Then, in this state, a driving test of the vehicle is performed to determine whether or not the travel performance in the driving test satisfies a predetermined criterion, that is, whether or not it is the intended travel performance. When the predetermined criterion is not satisfied in this determination, an auxiliary static eliminator with a surface area smaller than that of the main static eliminator is attached to the engine cover 44. Then, in this state, a driving test of the vehicle is performed. Until the predetermined criterion is satisfied, the number of auxiliary static eliminators that are attached to the engine cover 44 is increased. The auxiliary static eliminator is attached to the engine cover 44 such that the connecting portion 54 of the transfer member (i.e. the lead wire 52) is located within a range of the static elimination effect by the auxiliary static eliminator. The range of the static elimination effect by the auxiliary static eliminator is one example of a "second range" in the embodiment of the disclosure.

As described above, the self-discharge static eliminator 50 may be attached to the cylinder head cover 43 made of the resin material, instead of the engine cover 44. Since the self-discharge static eliminator 50 is configured to perform static neutralization/elimination by producing air ions with the polarity opposite to that of the potential of the self-discharge static eliminator 50, the self-discharge static eliminator 50 may be attached at a position where the flow of the outside air is generated. The position where the self-discharge static eliminator 50 is attached may be the upper surface of the engine cover 44.

Figure 11:
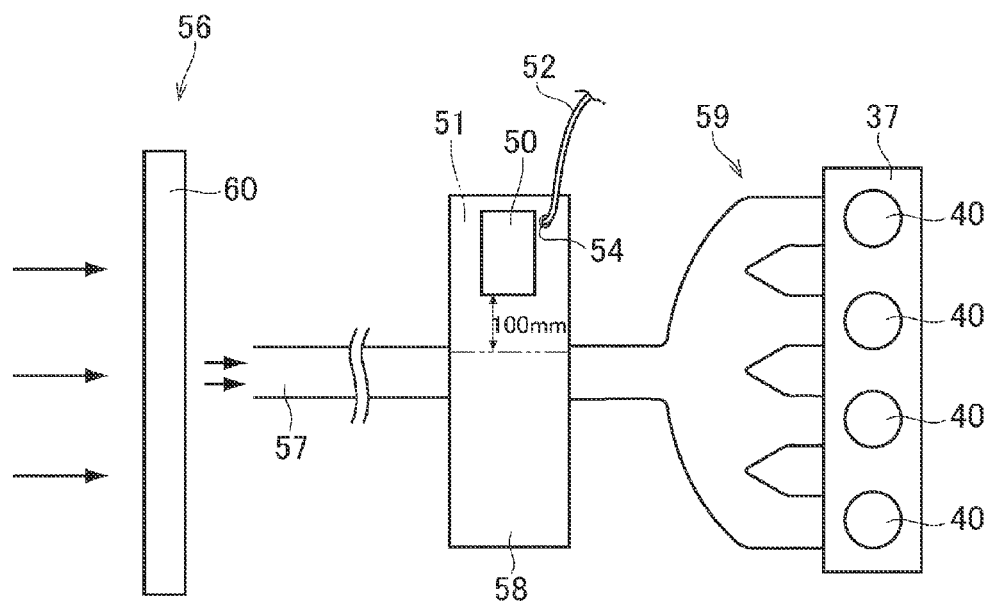
FIG. 11 is a schematic diagram for explaining an example of a configuration for introducing the outside air into the engine.

The engine 37 is configured to introduce the outside air. FIG. 11 schematically shows one example of such a configuration. In the example shown in FIG. 11, a radiator 56 for introducing the outside air into the engine room 33 is provided at the vehicle front. An intake duct 57 that is open to the vehicle front is disposed in the engine room 33 on the vehicle rear side of the radiator 56. An air cleaner 58 for removing foreign matter contained in the outside air is connected to some portion of the intake duct 57. An intake manifold 59 for branching the outside air, flowing through the intake duct 57, according to the number of the cylinder bores 40 formed in the cylinder block 41 is connected to an end portion on the engine 37 side of the intake duct 57. A radiator cover 60 housing the radiator 56, the intake duct 57, the air cleaner 58, and the intake manifold 59 are each made of a resin material that is electrostatically charged more easily than a metal material. Accordingly, the self-discharge static eliminator 50 may be attached to an outer surface (a surface that comes in contact with the outside air) of the radiator cover 60, the intake duct 57, the air cleaner 58, or the intake manifold 59, instead of the engine cover 44. More specifically, the self-discharge static eliminator 50 may be attached at a position where the flow of the outside air such as vehicle traveling wind is generated. The radiator cover 60, the intake duct 57, the air cleaner 58, or the intake manifold 59 is one example of a "duct" in the embodiment of the disclosure. In FIG. 11, there is shown an example in which the self-discharge static eliminator 50 is attached to the air cleaner 58, wherein the static elimination region 51 is shown by a two-dot chain line.

Figure 12:
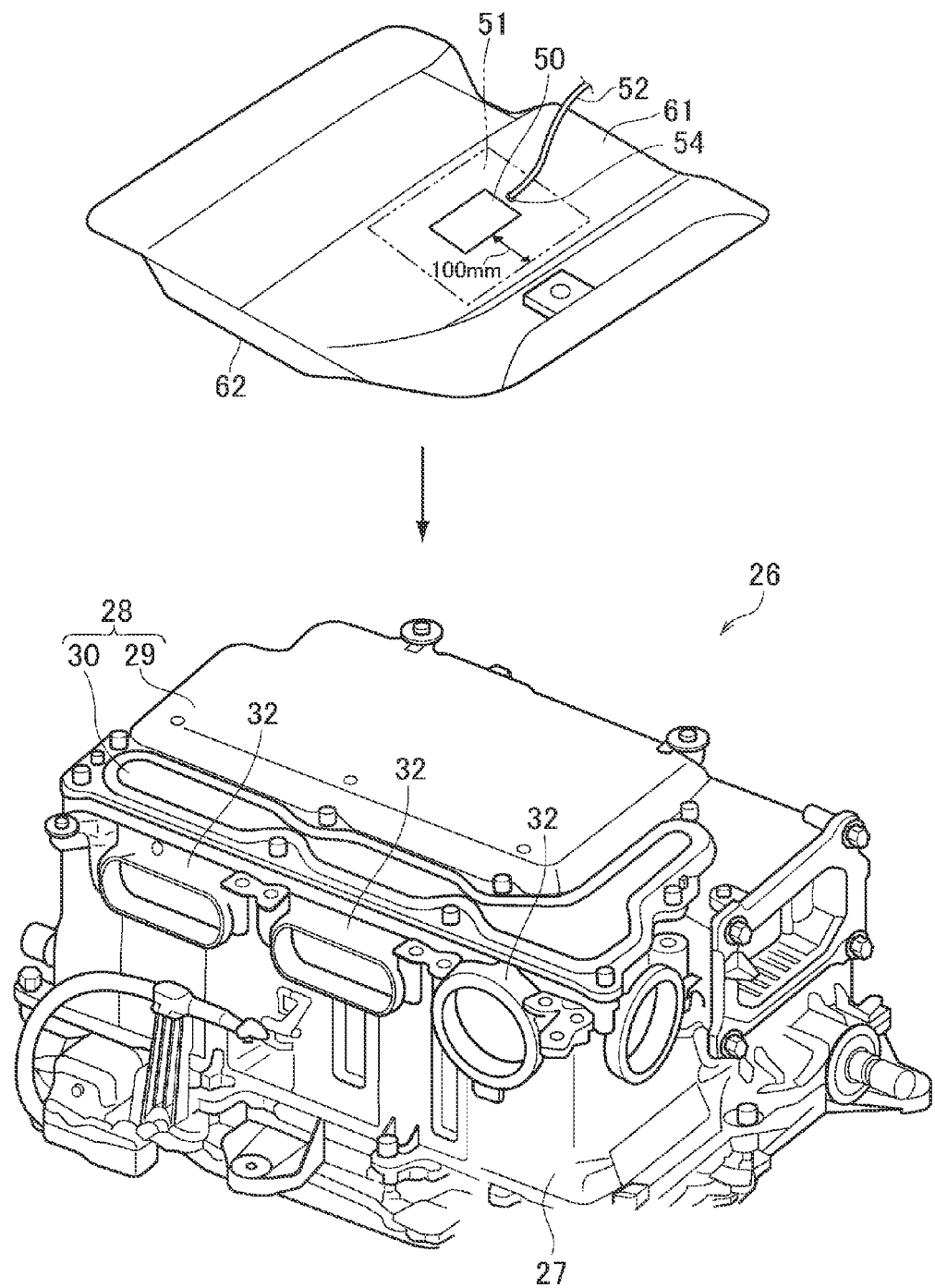
FIG. 12 is a schematic diagram for explaining a configuration example of attaching a sound insulation plate to an upper surface of the case.

As shown in FIG. 12, a sound insulation plate 61, made of a resin material, for insulating abnormal sound that is generated in the electric power control unit S may be attached to an upper surface of the case 26. The self-discharge static eliminator 50 may be attached to an outer surface of the sound insulation plate 61. The sound insulation plate 61 is one example of a "first plate member" or a "sound insulation cover" in the embodiment of the disclosure. A cushion 62 for absorbing vibration of the case 26 is attached to a lower surface of the sound insulation plate 61, so that the sound insulation plate 61 is fixed to the case 26 with the cushion 62 interposed therebetween. Accordingly, the cushion 62 may be made of a conductive material, and the static elimination region 51, where static electricity is eliminated by the self-discharge static eliminator 50, and the case 26 may be electrically connected to each other via the cushion 62 instead of the lead wire 52. In FIG. 12, the static elimination region 51 is shown by a two-dot chain line.

Figure 13:
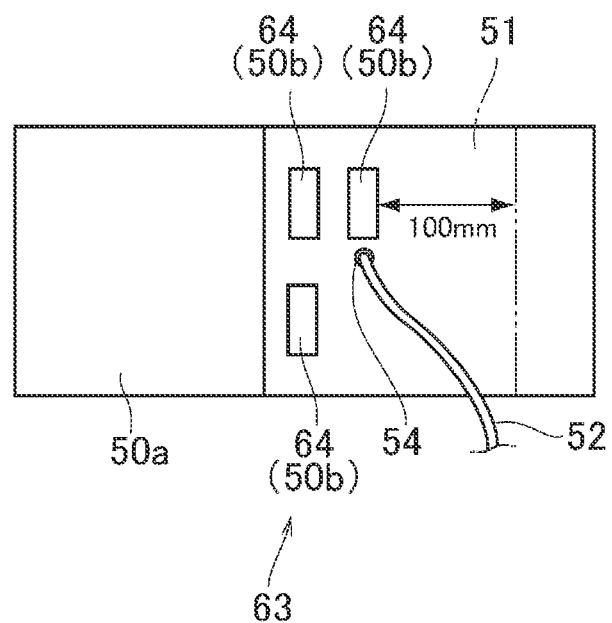
FIG. 13 is a schematic diagram for explaining an example in which the self-discharge static eliminator is attached to a plate made of a resin material.

In consideration of attaching the self-discharge static eliminator 50 to the existing vehicle Ve and of sequential processes of the manufacture, when attaching the self-discharge static eliminator 50 after the engine 37 and so on are attached to the vehicle body 1, the self-discharge static eliminator 50 may be attached to a plate 63 made of a resin material as shown in FIG. 13. Then, the plate 63 may be attached to one of the members constituting the vehicle body 1, one of the devices attached to the vehicle body 1, or one of the engine cover 44, the cylinder head cover 43, the intake duct 57, and so on. The plate 63 is one example of a "second plate member" in the embodiment of the disclosure, while the engine cover 44, the cylinder head cover 43, the intake duct 57, or the like to which the plate 63 is attached is one example of a "second predetermined member" in the embodiment of the disclosure.

The self-discharge static eliminator 50 attached to the plate 63 in FIG. 13 is configured such that a paint for discharge is applied to a portion of a front surface of the plate 63. Sheets 64 are attached to portions, where the paint is not applied, of the front surface of the plate 63, while the member such as the engine cover 44 is attached to a back surface of the plate 63. That is, the surface to which the self-discharge static eliminator 50 is attached is an outer surface (a surface that comes in contact with the outside air). More specifically, the self-discharge static eliminator 50 is attached to the surface on the side where the flow of the outside air such as vehicle traveling wind is generated. The self-discharge static eliminator 50 formed by the paint serves as a main static eliminator 50a, while the self-discharge static eliminator 50 formed by each of the sheets 64 serves as an auxiliary static eliminator 50b. In FIG. 13, the static elimination region 51 is shown by a two-dot chain line, i.e. the range on the self-discharge static eliminator 50 side of the two-dot chain line represents the static elimination region 51.

The engine cover 44 is not limited to one provided on the upper side of the engine 37 and may be a side cover provided on the lateral side of the engine 37 or an undercover provided on the lower side of the engine 37. Alternatively, it may be a cover member covering the motor 3 that serves as the drive power source instead of the engine 37, or a cover member covering, for example, a fuel cell mounted on a fuel cell vehicle.

What is claimed is:

1. A vehicle comprising:
a vehicle body;
a tire having an electric resistance value, the tire held by the vehicle body;
a case and an electric power control unit being mounted on the vehicle body, the case housing the electric power control unit, the electric power control unit including at least one of an inverter and a converter;
a first predetermined member mounted on the vehicle body, wherein there is a second electric resistance between the first predetermined member and the vehicle body, and wherein the first predetermined member is an engine cover or a cylinder head cover;
a self-discharge static eliminator connected to the first predetermined member, the self-discharge static eliminator configured to, be discharged by air ions flowing on a surface of the self-discharge static eliminator; and
a transfer member connecting a first connecting portion and a second connecting portion to each other and having a third electric resistance between the first connecting portion and the second connecting portion, the first connecting portion being a portion of the first predetermined member within a predetermined range in which elimination of static electricity is performed by the self-discharge static eliminator, the second connecting portion being a portion of the case;
wherein the second electric resistance is greater than the third electric resistance.

2. The vehicle according to claim 1, wherein
the first predetermined member is a member that is easily electrostatically charged compared to a metal material.

3. The vehicle according to claim 1, wherein
the first predetermined member is a member made of a resin material.

4. The vehicle according to claim 3, further comprising:
a drive power source; and
a cover member covering the drive power source,
wherein the first predetermined member is the cover member.

5. The vehicle according to claim 3, further comprising
an engine, the engine including a cylinder block, a cylinder head, and a head cover, the cylinder block provided with a plurality of cylinder bores, the cylinder head provided on the cylinder block so as to cover the cylinder bores, the head cover provided on the cylinder head so as to cover an outer surface of the cylinder head,
wherein the first predetermined member is the head cover.

6. The vehicle according to claim 3, further comprising:
a drive power source; and
a duct configured such that outside air flows toward the drive power source,
wherein the first predetermined member is the duct.

7. The vehicle according to claim 3, further comprising
a first plate member provided on the case,
wherein the first predetermined member is the first plate member.

8. The vehicle according to claim 7, wherein
the first plate member is a sound insulation cover covering at least a part of the case.

9. The vehicle according to claim 3, further comprising
a second plate member provided on a second predetermined member that is different from the case,
wherein the first predetermined member is the second plate member.

10. The vehicle according to claim 9, further comprising:
a drive power source; and
a duct configured such that outside air flows toward the drive power source,
wherein the second predetermined member is one of the drive power source and the duct.

11. The vehicle according to claim 9, further comprising
an engine, the engine including a cylinder block, a cylinder head, and a head cover, the cylinder block provided with a plurality of cylinder bores, the cylinder head provided on the cylinder block so as to cover the cylinder bores, the head cover provided on the cylinder head so as to cover an outer surface of the cylinder head,
wherein the second predetermined member is the head cover.

12. The vehicle according to claim 1, wherein
the self-discharge static eliminator includes a main static eliminator and an auxiliary static eliminator, the main static eliminator covers a predetermined area of an outer surface of the first predetermined member, the auxiliary static eliminator covers a surface, that is different from a surface covered by the main static eliminator, of the outer surface of the first predetermined member, the auxiliary static eliminator is configured to perform elimination of static electricity for the first predetermined member in addition to an amount of elimination of static electricity by the main static eliminator.

13. The vehicle according to claim 12, wherein
the main static eliminator includes a discharge paint applied to the outer surface of the first predetermined member.

14. The vehicle according to claim 13, wherein
the discharge paint includes at least one of a metal paint and a carbon paint.

15. The vehicle according to claim 1, further comprising
a drive motor configured to output a torque by being supplied with electric power from the electric power control unit,
wherein the self-discharge static eliminator is provided so as to have a surface area that is based on a predetermined criterion including a travel characteristic of the vehicle.

16. The vehicle according to claim 15, wherein
the surface area is an effective discharge area in which self-discharge occurs, the effective discharge area being 10625 mm2.

17. The vehicle according to claim 1, wherein
one end of the transfer member is connected to a portion of the case, a charged positive potential of the portion of the case is higher than a charged positive potential of the other portion of the case.

18. The vehicle according to claim 17, further comprising:
a predetermined device electrically connected to the electric power control unit; and
a wire harness connecting the predetermined device and the electric power control unit to each other,
wherein the case includes a connection port, one end of the wire harness is connected to the connection port, and the one end of the transfer member is connected to the case within a predetermined range from the connection port.

19. The vehicle according to claim 1, wherein
the first connecting portion is provided in a range within 100 mm from an outer edge of the self-discharge static eliminator.

* * * * *